United States Patent [19]

Watanabe

[11] 4,019,385
[45] Apr. 26, 1977

[54] NOISE COMPENSATION IN ELECTROMAGNETIC FLOWMETER

[75] Inventor: Masayasu Watanabe, Yokohama, Japan

[73] Assignee: Hokushin Electric Works, Ltd., Tokyo, Japan

[22] Filed: Oct. 6, 1975

[21] Appl. No.: 620,105

[30] Foreign Application Priority Data

Oct. 30, 1974   Japan ............................ 49-125937

[52] U.S. Cl. ........................................ 73/194 EM
[51] Int. Cl.$^2$ ........................................ G01F 1/58
[58] Field of Search ............................ 73/194 EM

[56] References Cited

UNITED STATES PATENTS

| | | | |
|---|---|---|---|
| 3,316,762 | 5/1967 | Westersten | 73/194 EM |
| 3,449,951 | 6/1969 | Westersten | 73/194 EM |
| 3,739,640 | 6/1973 | Folts | 73/194 EM |

*Primary Examiner*—Charles A. Ruehl

[57] ABSTRACT

A noise-compensating circuit for an electromagnetic flowmeter in which the fluid to be metered is conducted through a flow tube having a pair of diametrically-opposed electrodes mounted thereon, the fluid intercepting an electro-magnetic field whereby a voltage is induced in the fluid which is transferred to the electrodes to produce a flow signal that is a function of flow rate. Noise resulting from asymmetry in the magnetic field as well as noise arising from the signal leads is eliminated by means including a loop coil symmetrically disposed with respect to the transverse axis passing through the electrodes, the loop coil being so connected that the error current induced therein acts to cancel out the noise components in the flow signal.

2 Claims, 11 Drawing Figures (SECOND EMBODIMENT)

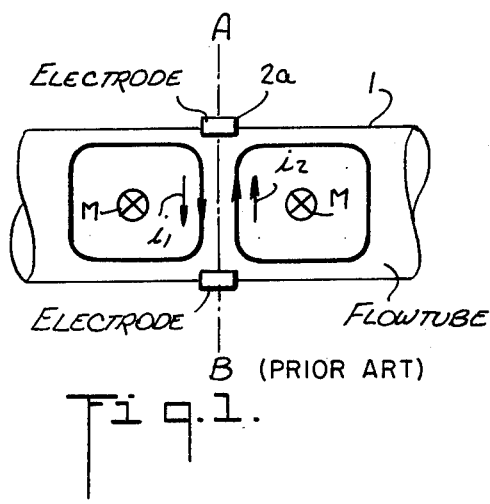
Fig.1. (PRIOR ART)
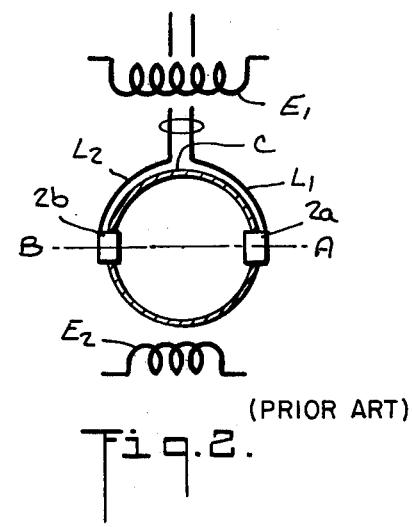
Fig.2. (PRIOR ART)
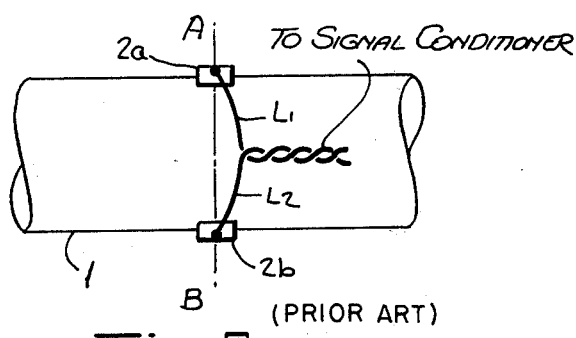
Fig.3. (PRIOR ART)
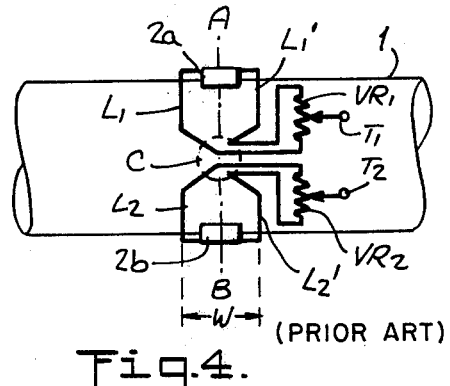
Fig.4. (PRIOR ART)
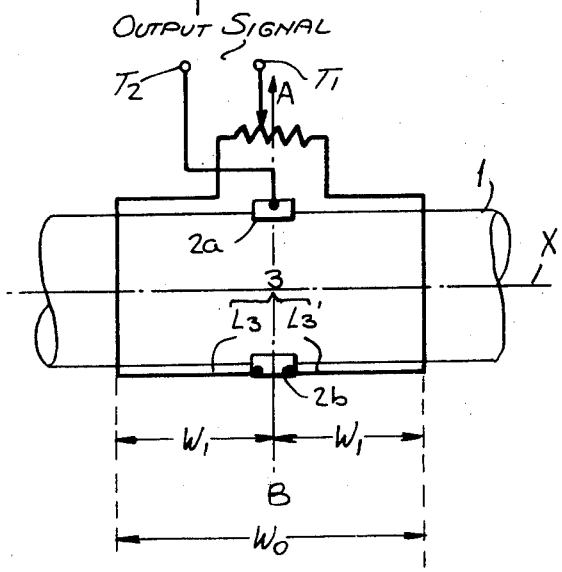
Fig.5. (FIRST EMBODIMENT)
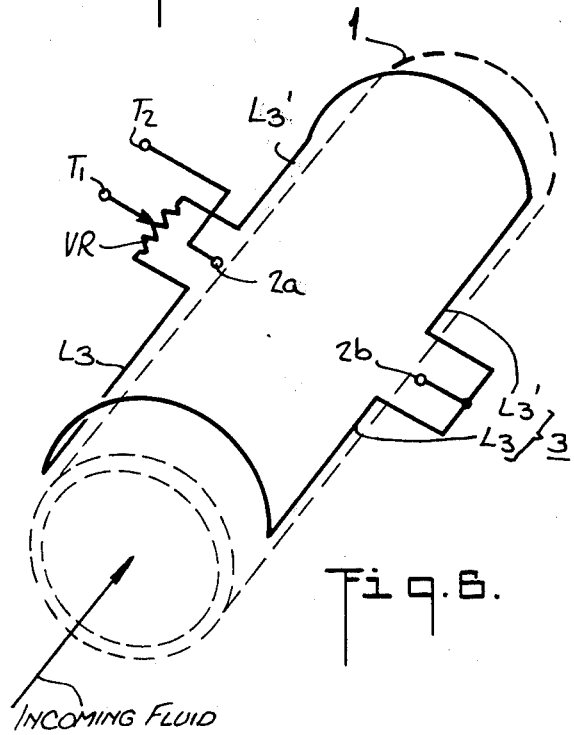
Fig.6.

(SECOND EMBODIMENT)

(THIRD EMBODIMENT)

(FOURTH EMBODIMENT)

FIFTH EMBODIMENT

SIXTH EMBODIMENT

NOISE COMPENSATION IN ELECTROMAGNETIC FLOWMETER

BACKGROUND OF THE INVENTION

This invention relates generally to electromagnetic flowmeters, and more particularly to a noise-compensating arrangement for eliminating from the flow signal noise components arising from an asymmetrical condition in the main magnetic field established in the flowmeter as well as from misalignment of the signal lead wires connected to the flowmeter electrodes.

In a conventional flowmeter, the fluid whose flow rate is to be measured is conducted through a flow tube having a pair of diametrically-opposed electrodes mounted thereon. The flowing fluid intercepts a main magnetic field whose lines of flux are perpendicular both to a transverse axis extending across the tube between the electrodes and to the longitudinal axis of the flow tube, as a result of which a voltage is induced in the fluid which is transferred to the electrodes to generate a flow signal that is a function of flow rate.

Ideally, the magnetic field should be perfectly symmetrical with respect to the above-noted transverse axis, but in actual practice this ideal is difficult to attain and the field is somewhat asymmetrical. As a consequence of such asymmetry, a noise voltage is generated between the electrodes which produces an error signal whose largest component is 90° out of phase with the flow signal.

Another source of noise is that produced by misalignment of the signal leads connected to the electrodes. These leads, in combination with the conductive liquid path extending between the electrodes to which the leads are connected, constitute an imaginary loop. Ideally, this loop should lie in a plane which is perpendicular to the excitation coils that produce the magnetic field, but in practice the imaginary loop is disposed in a somewhat inclined plane. As a result of this misalignment, magnetic coupling exists between the excitation coils and the imaginary loop, thereby generating noise which is 90 degrees out of phase with the flow signal. This gives rise to an inaccurate flow rate measurement.

SUMMARY OF INVENTION

In view of the foregoing, it is the main object of this invention to provide an electromagnetic flowmeter having a noise-compensating circuit adapted to eliminate noise components arising from an asymmetrical condition in the main magnetic field as well as from misalignment of the signal leads connected to the flowmeter electrodes.

Briefly stated, these objects are attained in an electromagnetic flowmeter in which the fluid to be metered is conducted through a flow tube having a pair of diametrically-opposed electrodes mounted thereon, the fluid intercepting an electromagnetic field whereby a voltage is induced in the fluid which is transferred to the electrodes to produce a signal that is a function of flow rate, the signal being applied by leads connected to the electrodes to a signal conditioner.

Noise resulting from asymmetry in the magnetic field as well as noise arising from the signal leads is eliminated by means including a loop coil symmetrically disposed with respect to the transverse axis passing through the electrodes, the loop coil being so connected that the error current induced therein acts to cancel out the noise components in the flow signal.

OUTLINE OF DRAWINGS

For a better understanding of the invention as well as other objects and further features thereof, reference is made to the following detailed description to be read in conjunction with the accompanying drawings, wherein:

FIG. 1 schematically represents, in plan view, a conventional electromagnetic flowmeter in which noise is generated as a result of an asymmetrical magnetic field;

FIG. 2 is a transverse section taken through axis A–B in FIG. 1;

FIG. 3 schematically represents, in plan view, a conventional electromagnetic flowmeter in which noise is generated as a result of misalignment of the signal lead wires;

FIG. 4 is a plan view of an electromagnetic flowmeter provided with a known type of noise-compensating circuit;

FIG. 5 is a plan view of an electromagnetic flowmeter having a noise-compensating circuit in accordance with a first preferred embodiment of the invention;

FIG. 6 is a perspective view of the flowmeter which is equipped with the first embodiment of the invention;

DESCRIPTION OF INVENTION

The Asymmetrical Field Noise Problem

Figure 7:
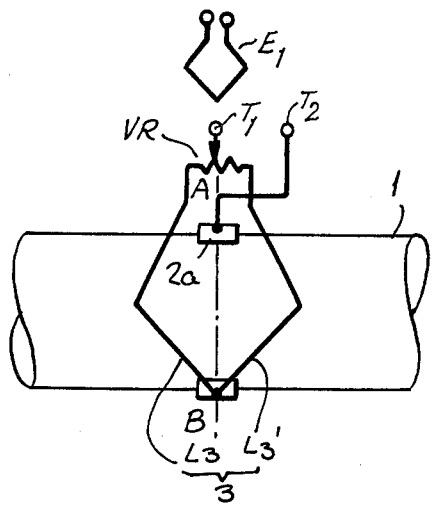
FIG. 7 is a plan view of a flowmeter which includes a second preferred embodiment of the invention.

In a conventional electromagnetic flowmeter, as shown in FIGS. 1 and 2, the fluid whose flow rate is to be measured is conducted through a flow tube 1 having mounted thereon at diametrically-opposed positions a pair of detecting electrodes $2a$ and $2b$ which lie on a transverse axis A–B extending across the tube.

A magnetic field is established by the excitation coils $E_1$ and $E_2$ of an electromagnet (shown schematically only in FIG. 2), whose lines of flux are perpendicular both to transverse axis A–B and to the longitudinal axis of the flow tube. When the flowing fluid intersects this magnetic field, a voltage which is proportional to the average velocity of the fluid and hence to its average volumetric rate is induced therein.

The induced voltage is transferred to detecting electrodes $2a$ and $2b$ and is applied by signal leads $L_1$ and $L_2$ connected thereto to a signal conditioner (not shown) adapted to amplify and process the detected signal to produce an output signal for actuating an indicator, a recorder or process control system in the usual manner.

The electromagnet is generally excited by A-C power and, under ideal conditions, establishes a magnetic field which is perfectly symmetrical with respect to transverse axis A–B. In actual practice, however, such perfect symmetry is virtually impossible to attain and some degree of asymmetry exists as a result of which a noise voltage is generated between electrodes $2a$ and $2b$.

To explain this in greater detail, we shall first consider the conditions which prevail in the flow tube when a magnetic field M is established therein which is perpendicular to transverse axis A–B. As a result of this field, currents $i_1$ and $i_2$ are induced within the flow tube in the regions on either side of axis A–B.

When the magnetic fields in the respective regions are perfectly symmetrical, then equal currents $i_1$ and $i_2$ of opposite polarity will flow and no noise or error signal will be developed across electrodes 2a and 2b. But when asymmetry exists, then an error signal will be produced which adversely affects the accuracy of the flow rate reading.

Though the largest component of this error signal is 90° out of phase with the flow signal (so-called quadrature noise), some in-phase and harmonic noise components are included therein. Compensation for in-phase noise and harmonic noise is effected by utilizing the remaining in-phase noise and harmonic noise components in the induced voltages.

We shall now explain why asymmetrical magnetic fields are found in an electromagnetic flowmeter. As is well known, there exists a phase lag between the current flowing in the excitation coils and the magnetic flux density, the degree of this lag depending on hysteresis or the iron loss of the magnetic core of the electromagnet.

It is to be noted, incidentally, that even though local zones within the magnetic core exhibit different iron losses, symmetrical magnetic fields would nevertheless be created should these zones be symmetrically disposed relative to transverse axis A–B, for in that event equal currents of opposite polarity would be generated and a noise component would not then be developed across electrodes 2a and 2b.

But when these local iron loss zones are not symmetrically disposed relative to transverse axis A–B, and when each iron loss does not vary at the same rate, then one encounters a flux density phase lag. As a consequence, the magnetic fields established in the respective regions on either side of a plane passing through axis A–B and parallel to the magnetic lines of flux are asymmetrical, thereby causing noise to be generated.

In summary, therefore, the phase of current components $i_1$ and $i_2$ in FIG. 1 is influenced by the phase of the flux density in the respective regions on either side of axis A–B, which flux density is subject to variations determined by the iron loss.

In addition, there are other factors resulting in asymmetrical magnetic fields, such as asymmetry of the magnetic impedance in the respective magnetic paths with respect to transverse axis A–B, mechanical displacement of the excitation coils, temperature variations, vibrations, etc.

The Lead Misalignment Noise Problem

Another source of noise is the 90° induced noise which results from misalignment of signal lead cores $L_1$ and $L_2$ connected to electrodes 2a and 2b. These wires, as shown in FIG. 2, extend from electrodes 2a and 2b along the circumference of flow tube 1, the wires then merging at a point C which is equidistant from electrodes 2a and 2b to form a bundle or cable which passes out of the meter and is connected to the signal conditioner.

Ideally, when signal lead wires $L_1$ and $L_2$ are precisely aligned in a plane perpendicular to excitation coils $E_1$ and $E_2$ and passing through transverse axis A–B, there is no magnetic coupling between these excitation coils and an imaginary loop constituted by the signal lead wires and a conductive liquid path within the flow tube extending between electrodes 2a and 2b.

In actual practice, this precise alignment, which is critical, is difficult to attain, for as shown in FIG. 3, the imaginary loop which includes signal leads $L_1$ and $L_2$ lies in a plane that is not perpendicular but is inclined, as a consequence of which magnetic coupling exists. This magnetic coupling gives rise to noise which is 90° out of phase with the flow signal induced in the electrodes.

This 90° noise can be obviated by compensating means of the type disclosed in our Japanese Patent 318,381. Such compensating means are illustrated in FIG. 4, where it will be seen that a pair of signal lead wires $L_1$ and $L'_1$ extend from electrode 2a and another pair of signal lead wires $L_2$ and $L'_2$ extend from electrode 2b. These pairs of wires extend along the circumference of flow tube 1 and are expanded symmetrically with respect to transverse axis A–B to define a pair of loop coils, the wires then merging at point C to form a bundle. The bundled wires are led out of the meter in a direction normal to the surface of the drawing.

A potentiometer $VR_1$ is connected across the ends of lead wires $L_1$ and $L'_1$, while a second potentiometer $VR_2$ is similarly connected to the ends of lead wires $L_2$ and $L'_2$. The flow signal is derived from sliders $T_1$ and $T_2$ of the respective potentiometr $VR_1$ and $VR_2$.

With this prior art arrangement, wires $L_1$ and $L'_1$ form a first loop coil having a width W, and wires $L_2$ and $L'_2$ form a second loop coil having the same width, the two loops being symmetrically disposed with respect to transverse axis A–B. The 90° noise component is compensated for by adjusting potentiometers $VR_1$ and $VR_2$. The adjustment of these potentiometers can be regarded as equivalent to varying the positions of lead wire pairs $L_1$ and $L'_1$ and $L_2$ and $L'_2$ within the range defined by width W.

But in the prior art 90 degree noise compensating arrangement of the type illustrated in FIG. 4, the width W of the loops is limited to a dimension which is adequate to compensate for misalignment of the signal lead wires $L_1$ and $L_2$ in FIG. 3. As a consequence, noise arising from asymmetry of the magnetic field is not eliminated by this arrangement, and the noise component is not completely removed from the flow signal.

First Embodiment

Referring now to FIGS. 5 and 6, there is shown a first embodiment of a noise compensating circuit for a flowmeter having a flow tube 1 and a pair of electrodes 2a and 2b mounted at diametrically-opposed positions thereon. The compensating circuit includes a loop coil 3 which extends in the direction of the longitudinal axis X of tube 1 and is symmetrically arranged with respect to the transverse axis A–B passing through the electrodes.

Noise compensating loop 3 is constituted by a pair of lead wires $L_3$ and $L'_3$. One end of wires $L_3$ and $L'_3$ is connected to electrode 26, the wires extending a distance $W_1$ in opposite directions with respect to axis A–B along a line parallel with flow tube axis X on one side of the tube. The wires then, at points equidistant from electrode 2b, are bent at right angles and continue to the opposite side of the flow tube along the circumference thereof.

When wires $L_3$ and $L'_3$ reach a plane on the opposite side of the tube 1 which is parallel to longitudinal axis X and passes through transverse axis A–B, they then are again bent at right angles, this time toward electrode $2a$. The other end of wires $L_3$ and $L'_3$ are connected respectively to the ends of a potentiometer VR.

The slider of potentiometer VR is connected to one signal output terminal $T_1$, the other signal output terminal $T_2$ being connected to electrode $2a$. With this arrangement, when the magnetic fields in the respective regions on opposite sides of transverse axis A–B are asymmetrical, then different eddy currents $i_1$ and $i_2$ flow in these regions, as shown in FIG. 1. On the other hand, because of the same magnetic fields, error current is induced in noise-compensating loop 3 formed by wires $L_3$ and $L'_3$. These wires are so connected that the error current induced in noise-compensating loop 3 acts to cancel out the error eddy current existing between different eddy currents $i_1$ and $i_2$. As a consequence, a mean flow signal can be obtained across output terminals $T_1$ and $T_2$ even when the magnetic fields relative to transverse axis A–B are asymmetrical.

With regard to the 90° noise resulting from magnetic coupling between the magnetic fluxes and the imaginary loop constituted by the signal wire leads and the conductive liquid path extending between the electrodes, this can be obviated by adjusting potentiometer VR so that the 90° noise currents flow in opposite directions in lead wires $L_3$ and $L'_3$ and thereby cancel out the induced 90° noise component.

Thus in the arrangement illustrated in FIG. 5, noise resulting from asymmetry of the magnetic field as well as noise arising from misalignment of the signal lead wires are eliminated by relatively simple means which are easily constructed and readily adjusted.

In order to effectively eliminate noise resulting from asymmetry of the magnetic field as well as misalignment of the lead wires, it is necessary that the whole width $W_o$ (twice $W_1$) of the noise-compensating coil 3 shown in FIG. 5 be determined in accordance with the diameter of flow tube 1 and the distribution of the magnetic fluxes.

In an electromagnetic flowmeter having a uniform magnetic field in a plane perpendicular to the longitudinal axis X of the flow tube (the flow direction), the length of the excitation coil in the direction of the tube axis is less than 2D, where D is the diameter of the flow tube. In order to eliminate noise fully, width $W_o$ of the noise-compensating coil 3 in accordance with the invention must be more than 1D but less than 2D. This does not necessarily mean that when width $W_o$ of the compensating coil 3 deviates from the above-specified limit, no noise is eliminated. In practice, even when width $W_o$ has a value in the order of 0.7 to 0.9D, a considerable degree of noise is eliminated.

But in a magnetic flowmeter in which a non-uniform magnetic field is established in order to render the meter insensitive to the flow velocity profile, the length of the excitation coil in the direction of flow tube axis X is ordinarily less than 1D. Hence, in this instance, width $W_o$ of noise-compensating loop 3 is made to be more than 0.2D but less than 0.9D.

While in practice the optimum width $W_o$ of the noise-compensating loop is determined by experiment, from the theoretical standpoint one may postulate that the value of width $W_o$ depends on the extent to which eddy currents $i_1$ and $i_2$ influence electrodes $2a$ and $2b$. It has been found that the efficiency of the noise-compensating coil is most remarkable for flowmeters whose flow tube diameter exceeds 200 mm.

Second Embodiment

In the arrangement shown in FIG. 7, the noise-compensating loop 3 constituted by wire leads $L_3$ and $L'_3$ have a diamond-shaped configuration rather than the rectangular configuration of the loop in FIGS. 5 and 6. In all other respects, the noise-compensating circuit is the same as that in the first embodiment and functions in essentially the same manner.

The diamond-shaped loop is preferably used in conjunction with flowmeters provided with excitation coils having a diamond-shaped formation, the like configuration of the noise-compensating coil and the excitation coils promoting more effective compensation.

Third Embodiment

Figure 8:
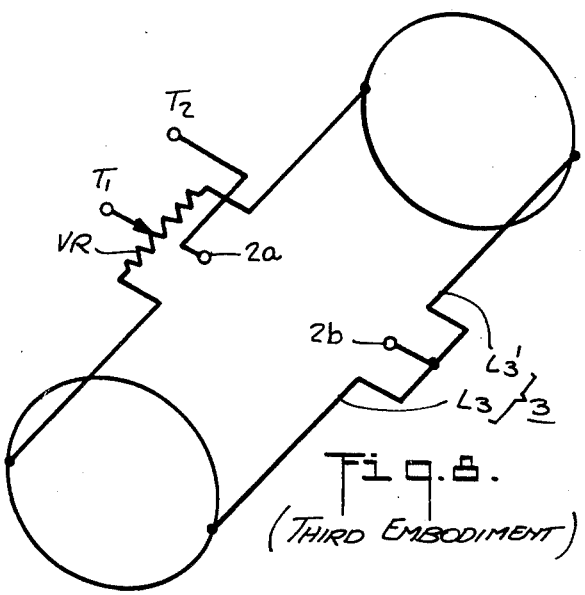
FIG. 8 is a perspective view of a noise compensating-coil incorporated in a third preferred embodiment of the invention.

The arrangement shown in FIG. 8 is identical to that of the first embodiment shown in FIGS. 5 and 6, except that the sides of loop 3, instead of being formed by semicircular wire sections of the lead wires $L_3$ and $L'_3$, are constituted by full rings which encircle the flow tube.

Fourth Embodiment

Figure 9:
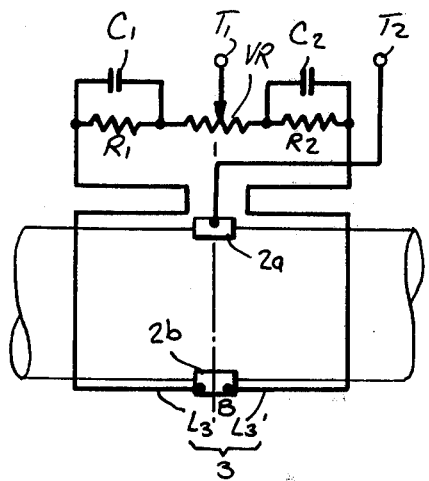
FIG. 9 is a plan view of the flowmeter having a fourth preferred embodiment of the invention.

In the noise-compensating circuit shown in FIG. 9, the ends of lead wires $L_3$ and $L'_3$ forming loop 3, instead of being connected directly to the opposite ends of potentiometer VR, are connected thereto through resistors $R_1$ and $R_2$, respectively, in order to effect minute adjustment of the potentiometer.

Moreover, a condenser $C_1$ is connected across resistor $R_1$ and a like condenser $C_2$ is connected across resistor $R_2$ to eliminate residual in-phase noises which cannot be entirely removed by noise-compensating loop 3 from the flow signal voltage.

The connection of condensers $C_1$ and $C_2$ is selected in accordance with the polarity of the residual in-phase noise. Consequently, this in-phase noise and all other noise components can be compensated for in this arrangement. When there is no liquid flow in the flow tube of the magnetic flowmeter, there is no need to effect zero adjustment in the converter or signal conditioner which is responsive to the output signal of the meter. Furthermore, because noise components are fully eliminated, zero drift effects are not experienced even when the flow direction changes from time to time.

Fifth Embodiment

Figure 10:
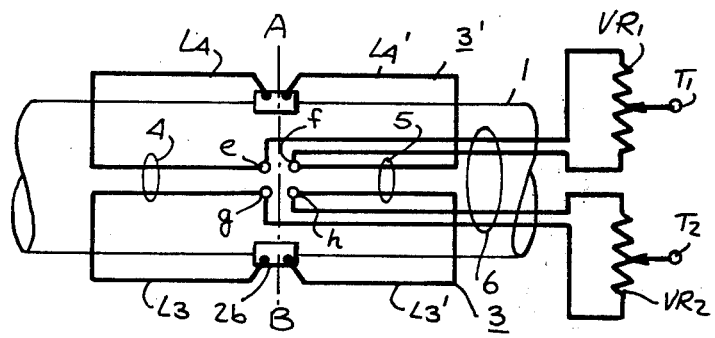
FIG. 10 is a plan view of a flowmeter provided with a fifth preferred embodiment of the invention.

Referring now to FIG. 10, there is shown a noise-compensating circuit in which the compensating loop is divided into two loop sections 3 and 3' disposed on the top of flow tube 1. These sections are formed by a first pair of lead wires $L_3$ and $L'_3$, which are connected at one end to electrode $2b$ and extend from this electrode, and a second pair of lead wires $L_4$ and $L'_4$, which are connected to electrode $2a$ and extend from this electrode.

End contacts $e$ and $f$ of wires $L_4$ and $L'_4$ are connected to the opposite ends of a potentiometer $VR_1$, whereas end contacts $g$ and $h$ of wires $L_3$ and $L'_3$ are connected to the opposite ends of a potentiometer $VR_2$. The sliders of these potentiometers are connected to signal output terminals $T_1$ and $T_2$. Although in this figure the leads extending between contacts $e$ to $h$ and potentiometers $VR_1$ and $VR_2$ appear to extend laterally, in practice these leads are led out of the meter in a direction perpendicular to the surface of the drawing.

When the noise-compensating loop is divided into loop sections in the manner shown in FIG. 10, it becomes possible to connect one potentiometer across one section and the other across the other section to obtain a high order of noise elimination.

Furthermore, it is preferable to bundle the lead wires at the positions indicated by numerals 4, 5 and 6 in FIG. 10 at which the multiple leads extend in parallel relation, in order to remove the influence of noise thereon.

Sixth Embodiment

Figure 11:
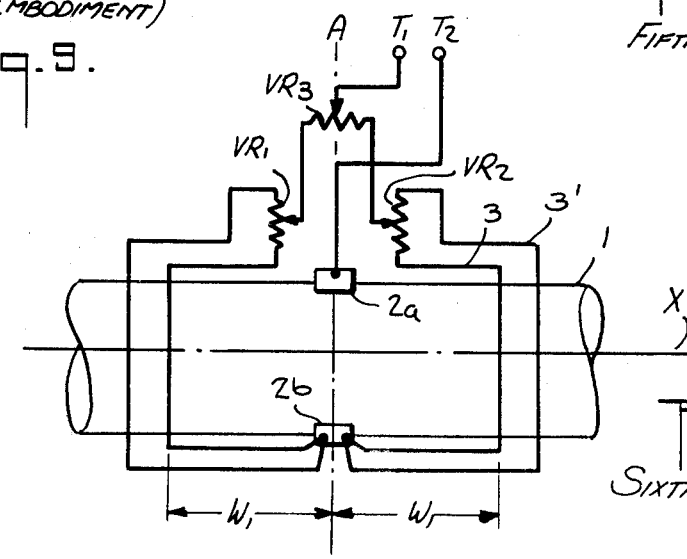
FIG. 11 is a plan view of a flowmeter that includes a sixth preferred embodiment of the invention.

In the arrangement shown in FIG. 11, two compensating loops 3 and 3' are provided, whose respective widths in the direction of axis X or flow tube 1 differ from each other. In this instance, potentiometers $VR_1$ and $VR_2$ are connected between the ends of loops 3 and 3', respectively, whereas a potentiometer $VR_3$ is connected between the sliders of potentiometers $VR_1$ and $VR_2$. The slider of potentiometer $VR_3$ is connected to a signal output terminal T, and the other signal output terminal is connected to electrode 2a.

In the noise-compensating circuit shown in FIG. 11, any imbalance with respect to width $W_1$ of the loops on opposite sides of transverse axis A–B is compensated for by adjusting potentiometers $VR_1$ and $VR_2$, whereas 90° noise is eliminated by adjusting potentiometer $VR_3$.

SUMMARY

As is evident from the foregoing, noise arising from asymmetrical eddy currents in the regions on opposite sides of transverse axis A–B and 90° noise resulting from magnetic coupling between the magnetic fluxes and the imaginary loop constituted by the signal lead wires and the conductive liquid path extending between the electrodes can simultaneously be eliminated by a noise-compensating circuit in accordance with the invention.

Because 90° noise as well as in-phase noise can be completely eliminated on the primary or flowmeter side of the flow measuring system, it becomes unnecessary to effect zero adjustment in the secondary or converter side. As a consequence, an exceptionally high level of compatibility is attainable between the primary and secondary.

Furthermore, even when the direction of flow changes from time to time, zero adjustment is unnecessary on the converter side. And since harmonic noise, which generally appears due to the influence of the magnetic field, can simultaneously be compensated for, an output having an excellent signal-to-noise ratio is obtainable.

Because a noise-compensating circuit in accordance with the invention is simple and easily constructed, one can economically produce highly-efficient electromagnetic flowmeters which yield accurate readings of flow rate.

While there have been shown and described preferred embodiments of noise compensation circuits for electromagnetic flowmeters, it will be appreciated that many changes and modifications may be made therein without, however, departing from the essential spirit of the invention.

I claim:
1. In an electromagnetic flowmeter provided with a flow tube through which there is conducted the fluid to be metered, the tube having a pair of electrodes mounted thereon at diametrically-opposed points along a transverse axis normal to the direction of flow, the flowing fluid intercepting a magnetic field established by diamond-shaped excitation coils, which field is somewhat asymmetrical with respect to said transverse axis, thereby inducing a voltage in the fluid which is transferred to the electrodes to produce a flow signal; a noise-compensating circuit for eliminating from the flow signal noise components resulting from magnetic coupling between the excitation magnetic fluxes and an imaginary loop formed by the signal lead wires and the conductive liquid path extending between said electrodes as well as from asymmetrical eddy currents flowing in regions on opposite sides of said transverse axis, said circuit comprising:
   A. two lead wires external to the tube, each connected at one end to one of said electrodes and extending symmetrically on opposite sides of said transverse axis and formed to define a diamond-shaped loop;
   B. a potentiometer connected between the other ends of said lead wires and having a slider; and
   C. a pair of output terminals, one of which is connected to said slider and the other to the other electrode.

2. A circuit as set forth in claim 1, wherein the width of said loop in the direction of the longitudinal axis of the flow tube is determined in relation to the diameter of the tube and the distribution of the magnetic fluxes.

* * * * *